J. N. KERR.
Fence.

No. 202,949.  Patented April 30, 1878.

Attest
Thos. S. Munrup
J. N. McCloskey

Inventor.
John Nevin Kerr

UNITED STATES PATENT OFFICE.

JOHN N. KERR, OF WEST GREENWOOD, PENNSYLVANIA.

IMPROVEMENT IN FENCES.

Specification forming part of Letters Patent No. 202,949, dated April 30, 1878; application filed November 13, 1877.

*To all whom it may concern:*

Be it known that I, JOHN N. KERR, of West Greenwood, in the county of Crawford and State of Pennsylvania, have invented certain Improvements in Fences, of which the following is a specification:

The object of my invention is to make a fence in convenient sections for handling, that will not require post-holes, that can be conformed to the make of the ground, whether going up a hill or running around its side, and that can be readily taken down, folded up, and packed away under cover till needed again.

Figure 1:
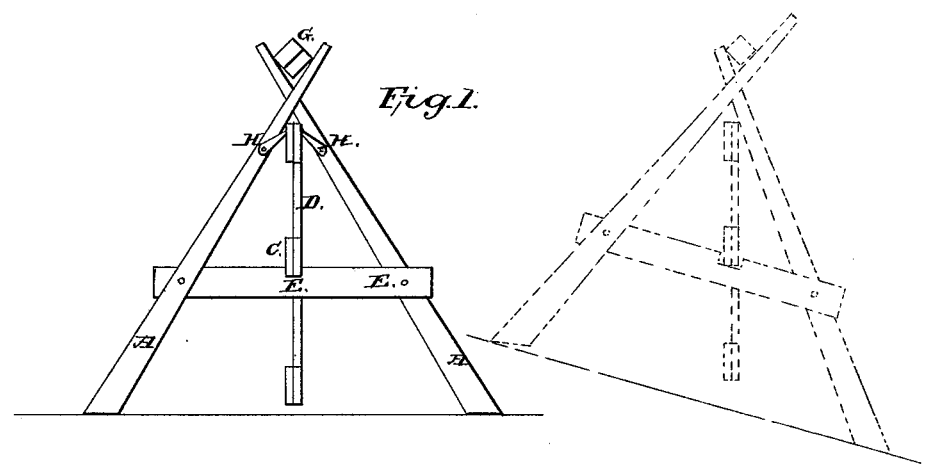

I make my portable folding fence as follows:

Figure 1 shows a sectional end view of a fence. A A and B, articulated at F F, form a trestle, and the panel or section of fence C D rests its middle board $c$ in a notch in the upper edge of the cross-bar B, the weight of the fence forcing the tops of stakes A A down across the top of the section, which is made still more rigid by the weight of the rider G; and, to prevent the fence from being blown or pushed out of shape, I fix a small pawl, H, to each stake at the proper place to have its sharp end impinge against the side of the top board. I pin the ends of riders to each other (see I, Fig. 3) in a continuous string, the pins to be taken out when the fence is folded away.

Figure 2:
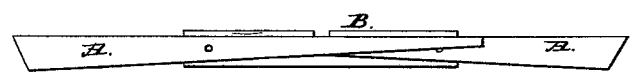
Figure 3:
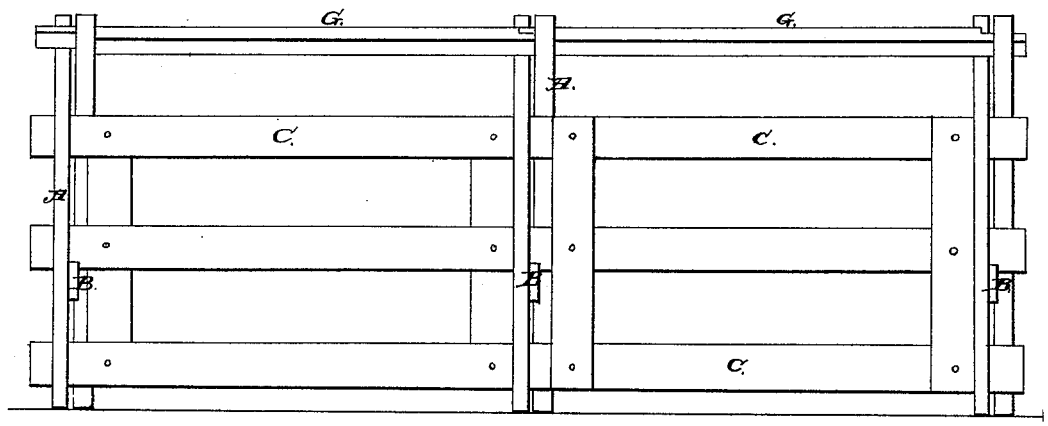
Figure 4:
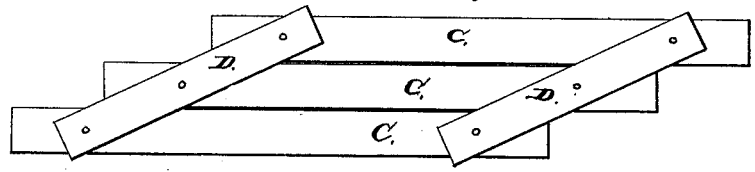

Fig. 2 shows the trestle folded up. Fig. 3 is a side view of two sections of fence set up complete. Fig. 4 is a panel folded for handling.

There is nothing touches the ground but the feet of the trestles, and these I coat with some cheap paint. There will be nothing to mar the ground after the fence is removed, and the scythe or lawn-mower can cut all the grass while it is standing, as the lower board need not come to within eight or ten inches of the ground.

In making the trestle, I take a plank—say, two inches thick and six inches wide—and cut it suitable lengths for the height of the required fence, and rip them in two, so that each piece will be two by two at one end, and two by four at the other.

The two pieces A A, I bolt near the ends of a bar, B, one on each side, so as to allow folding, as in Fig. 2. The bar B should be bolted at a point on the stakes A that will bring its central notch E at the proper height for the middle board $c$ to rest in. The notch should be just wide enough for the overlapping ends of two boards to fit into.

The panel, Fig. 4, I usually make of three boards, $c$, and two slats, D; but I do not confine myself to this, but make the fence tight or open, according to what is to be fenced out or in.

I place the slats about six inches from the ends of the boards, the slats of one panel being on one side, and those of the next on the other, so that when they overlap the ends of the boards abut against the slats of the adjoining panels, and thus the stakes grasp both panels together at the top.

In going up a hill, stakes A and slats D are perpendicular, but the boards would fall behind each other somewhat, as in Fig. 4; but in going along the side of a hill I would keep the fence perpendicular, and the trestle would conform to the make of the ground, as shown by the dotted lines in Fig. 1.

What I claim in a portable folding fence is—

1. The trestle A, A, and B, articulated at two points, so that the weight of the fence presses the stakes across the top boards, and binds two panels together, substantially as described.

2. In a portable folding fence, the pawls H H upon the stakes A A, to prevent any lateral movement in the parts at the top of the fence.

3. The combination of the trestle A, A, and B, panel C D, pawls H H, and continuous rider G, when constructed as and for the purpose specified.

JOHN NEVIN KERR.

Witnesses:
THOS. S. MINNISS,
J. N. McCLOSKEY.